Nov. 9, 1965  F. G. REUTER ETAL  3,216,593
DRAUGHT GEAR FOR VEHICLES
Filed July 22, 1963
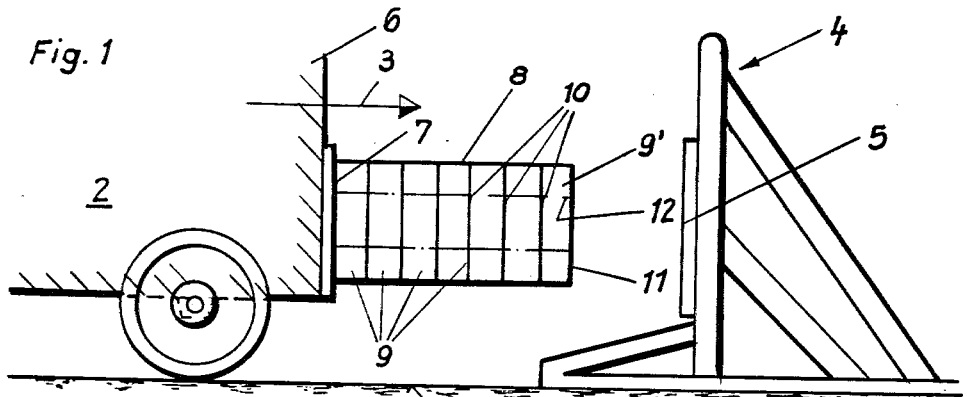
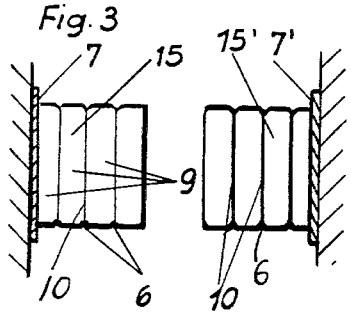
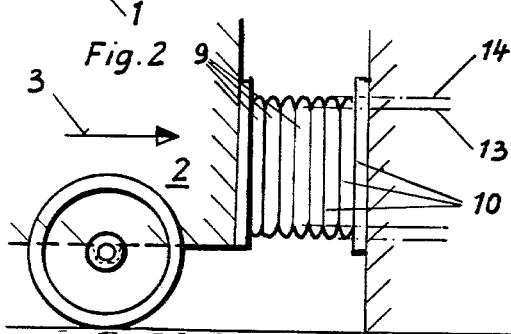
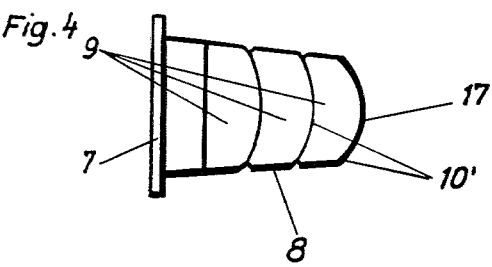
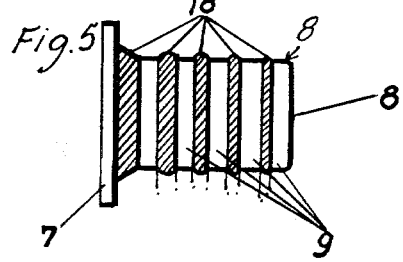
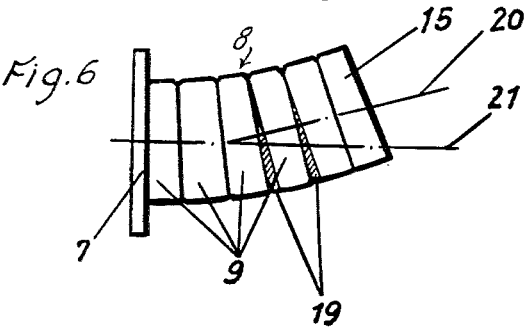
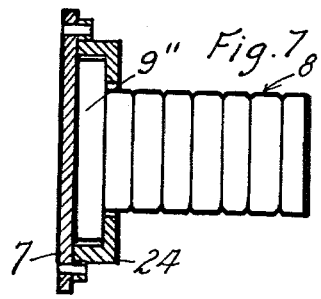
INVENTORS
FRANZ G. REUTER
REINHOLD E. SZONN
BY
Barnes, Kisselle, Raisch & Choate
ATTORNEYS United States Patent Office 3,216,593
Patented Nov. 9, 1965

3,216,593
DRAUGHT GEAR FOR VEHICLES
Franz G. Reuter and Reinhold E. Szonn, Lemforde, Germany, assignors to Cellasto Incorporated, Ann Arbor, Mich., a corporation of Michigan
Filed July 22, 1963, Ser. No. 296,651
1 Claim. (Cl. 213—45)

This invention concerns the construction of draught gear consisting of elastomer materials for vehicles.

The customary steel spring construction has the disadvantage that it hardly contributes to the absorption of the impact without dampers and in addition, the rebound force at the point of maximum compression causes a considerable acceleration. The application of these springs in combination with damping devices, on the other hand, involves a considerable structural investment and high maintenance and repair costs. In addition, such damping devices are highly stressed because the vehicles generally are exposed to the ambient temperature and are thus subject to a temperature range of up to 80° C. when exposure to the sun is taken into consideration.

Draught gear consisting of homogeneous-elastic materials in turn has the disadvantage that transverse stresses of such magnitude are experienced due to the incompressibility of the material that structural damage on the inside and particularly on the edges is unavoidable. In addition, the spring excursion remains within narrow limits.

It is the aim of the invention to produce draught gear which is distinguished by improved application characteristics in which the disadvantages of the customary draught gear designs are avoided and which thus has a more advantageous operating behavior as well as a longer life.

According to the invention, these advantages are realized by the fact that the buffer consists of several layers of a porous structure which are arranged consecutively in the direction of the main force and interconnected by intermediate layers of a different structure.

Draught gear of this type is comparatively easily manufactured and installed. It is charaterized by damping which exceeds 20% in each case and which can increase to 50% so that extraordinarily large impact forces can be absorbed with the required reliability. The shape of the cross-section of the buffer is of secondary influence. Operating characteristics are practically identical regardless of whether the cross-section is round, rectangular or of another shape.

According to another characteristic of the invention, the intermediate layers have a higher density. In the simplest case, the intermediate layers consist of a compacted cement layer by means of which the two adjacent main layers are interconnected.

In another version of the invention, the intermediate layers also can consist of the material of the main layers where a higher density and a lower porosity of the structure should be selected. Draught gear which is precisely suited for existing operating conditions can thus be manufactured in a particularly simple manner.

The invention offers another possibility by the use of homogeneous-elastic materials for the intermediate layers. Comparatively hard plates are generally involved here although the physical characteristics can be extensively adjusted to requirements.

It is furthermore in the scope of the invention to utilize intermediate layers consisting of a fabric on a cotton, metal or plastic base for special purposes. Which design should be preferred in the individual case depends entirely upon the corresponding technological requirements. This results in an extremely high adaptability of the draught gear of the invention.

For a control of the spring characteristics of the draught gear the main and/or intermediate layers can be of different thicknesses according to the invention. It is of special advantage when one or several intermediate layers on the underside of the buffer in one of the construction forms are of greater thickness than on the upper side of the buffer, i.e. in a wedge shape, in order to counteract a unilateral deformation of the draught gear under the influence of its own weight. The same results can be obtained also by a corresponding layer design of the main layers.

Since an unobjectionable geometric deformation of such draught gear is of decisive importance for the operating behavior, the invention in its additional version provides that the layer faces of the main layers are curved when necessary. Those surfaces facing the buffer head are preferably convex.

Of special advantage is the manufacture of the material with a porous structure on a polyurethane base. Materials of this type have an extremely high internal deformability and are resistant to such atmospheric influences as ozone, sun rays or the like as well as to oils, fats, etc. The specific weight can be adjusted correspondingly by influencing the pore formation. According to the invention, this value is generally below 0.65 g./cm.$^3$. Due to the porous structure, only a very small material displacement towards the outside is effected even at extremely high impact forces of up to 200 kp./cm.$^2$ which does not exceed a maximum of 10% of the original diameter. This has a particularly favorable effect on the spatial arrangement of the buffers of this invention.

This invention furthermore offers the possibility of the division of the draught gear into two buffers located at two opposite impact surfaces. This arrangement will be particularly important when a comparatively longer total spring unit is required on account of a certain breaking retardation and higher impact velocity.

Furthermore, it is in the scope of the invention to provide voids within the buffer units for ventilation purposes. Buffers of this type find application particularly at high impact frequencies, where ventilation appears to be desirable for heat removal. These voids can be of a continuous as well as of a blind form.

Further particulars, details and advantages of the invention result from the following description of a few preferred construction examples of the invention as well as on the basis of the drawing. The following is shown schematically:

FIG. 1, the vehicle before, and
FIG. 2, after arrest by a stop;
FIG. 3, a modified design form, as well as
FIGS. 4–6, additional special designs; and
FIG. 7, a possible installation form of the draught gear.

In the design example shown, the vehicle 2 moving on tracks indicated by 1 in the direction of arrow 3 is stopped by a buffer which is in a fixed position, is denoted by 4 and is provided with a buffer plate 5. The draught gear 8 is mounted on the face 6 of the vehicle 2 on the base plate denoted by 7. It consists of several—in the present case six—layer units 9 arranged in series in the direction of the main force corresponding to the direction of travel 3 and interconnected by intermediate layers 10. While the main layers have a porous structure and consist of a polyurethane, for example, the intermediate layers 10 in contrast have a greater density. Individual layers can be vulcanized or welded together or they may be cemented. Layer 9 which is adjacent to the base plate 7 is permanently connected to the base plate 7 by cementing or in a corresponding manner. Layer 9' forming the free end of the draught gear 8 can be equipped with an outer coating 11 for the protection against wear or the like. The cross-section of the draught gear 8 can be selected arbitrarily; it can be round as well as rectangular or oval-shaped. Draught gear 8 can be equipped with one or several cavities for the heat removal. The construction example given in FIG. 1 has been provided with the cavity 12 indicated by dot-dashes passing axially through the draught gear 8.

Due to the different structure of the individual layers 9 and 10 respectively of the draught gear 8 the figure shown in FIG. 2 results upon impact on the permanent stop. The main layers 9 are extensively compressed in comparison, while the intermediate layers indicated by 10 undergo a considerably lesser deformation due to the greater density. In a corresponding manner, the diameter of the various layers 9 and 10, respectively, varies in a different manner. The line denoted by 13 in FIG. 2 corresponds approximately to the surface line of the draught gear 8 in the state of FIG. 1. In the compressed state according to FIG. 2 an increase in diameter up to the surface line 14 results for the main layers 9 of the buffer units, while the intermediate layers 10 practically retain their original circumference. With respect to the length of the undeformed draught gear 8 according to FIG. 1 and that of the most extensively compressed buffer according to FIG. 2, a ratio of 1:0.35 results from the drawing. This corresponds to a compression of 65%.

FIG. 3 shows the possibility of the division of the draught gear into two buffers 15 and 15' mounted on the opposing base plates 7 and 7'. It can be seen furthermore in this design that the intermediate layers 10 have a smaller diameter than the main layers 9; this results in the formation of notches 16 at the circumference of the buffers 15 and has a favorable effect during their compression.

The draught gear 8 according to FIG. 4 tapers in the direction of its surface 17. This surface and those surfaces of buffer layers 9 contacting the intermediate layers 10' are crowned. The advantage of this design is an unobjectionable deformation during contact with a permanent buffer surface.

In FIG. 5, the intermediate surfaces between the main layers 9 of the buffer 8 with a porous structure are denoted by 18. It is indicated furthermore in FIG. 5 that the thickness of the intermediate layers 18 decrease towards the free end of buffer 8. This results in progressive pressure-path characteristics of the buffer.

FIG. 6 shows a modified design which finds particular application in draught gear 8 of greater axial length and thus counteracts a downward deflection of the buffer 8 due to the influence of gravity. Due to the fact that the two intermediate layers indicated by 19 are wedge-shaped, i.e. they have a thickness decreasing from the underside to the top side of buffer 8, a deviation of the longitudinal center axis 20 of the buffer with respect to the imagined horizontal line 21 results theoretically. The initial weight of the buffer 8, however, equalizes the influence, so that lines 20 and 21 practically coincide.

It is understood that the same effect can also be attained by an analogous design of the individual main layers 9.

FIG. 7 shows a special type of mounting of the draught gear 8 on the base plate 7. For this purpose, the diameter of the main layer 9" adjacent to the base plate has been increased and is held by a circular housing 24 which is bolted on the base plate 7. Additional safety is provided in this manner beside the cementing.

It is understood that the invention is not limited to the designs described in the above and shown in the drawings, but that numerous modifications are possible without exceeding the basic idea of the invention.

We claim:

A buffer device for vehicles adapted to have a cantilever position at the end of a vehicle being mounted at one end thereof and projecting horizontally away from the vehicle on a longitudinal axis arranged in the direction of the main force to be absorbed comprising a plurality of layers of porous polyurethane material bonded to alternate layers interposed therebetween of a non-porous dense material forming intermediate layers, said intermediate layers having a wedge shape in vertical section with the thicker portion of the wedge at the bottom to compensate for the inherent weight of the projecting buffer.

References Cited by the Examiner

UNITED STATES PATENTS

| | | | |
|---|---|---|---|
| Re. 18,672 | 11/32 | Lyons | 114—219 |
| 7,706 | 10/50 | Ray | 267—63 |
| 854,290 | 5/07 | Hale | 213—221 |
| 2,270,902 | 1/42 | Rubissow | 248—358 |
| 2,553,636 | 5/51 | Dath | 213—40 |
| 2,639,044 | 5/53 | Mulcahy | 213—45 |
| 2,982,536 | 5/61 | Kordes | 267—1 |
| 3,075,649 | 1/63 | Blattner et al. | 213—32 |
| 3,084,809 | 4/63 | Lucchese | 213—220 |
| 3,147,964 | 9/64 | Wolf | 267—63 |

FOREIGN PATENTS

| | | |
|---|---|---|
| 1,236,420 | 9/59 | France. |
| 808,789 | 2/59 | Great Britain. |
| 585,603 | 3/58 | Italy. |

ARTHUR L. LA POINT, *Primary Examiner.*

LEO QUACKENBUSH, *Examiner.*